US012575543B2

(12) United States Patent
Yi et al.

(10) Patent No.: US 12,575,543 B2
(45) Date of Patent: Mar. 17, 2026

(54) SEMI-AUTOMATIC COMBING DEVICE

(71) Applicant: VOOCOO Innovations Co., Ltd., Shenzhen (CN)

(72) Inventors: Wenlong Yi, Shenzhen (CN); Junkai Huang, Shenzhen (CN); Jiawen Liu, Shenzhen (CN)

(73) Assignee: VOOCOO Innovations Co., Ltd., Shenzhen (CN)

( * ) Notice: Subject to any disclaimer, the term of this patent is extended or adjusted under 35 U.S.C. 154(b) by 0 days.

(21) Appl. No.: 18/914,073

(22) Filed: Oct. 12, 2024

(65) Prior Publication Data

US 2025/0176499 A1 Jun. 5, 2025

(30) Foreign Application Priority Data

Nov. 30, 2023 (CN) ......................... 202323249095.4

(51) Int. Cl.
*A01K 13/00* (2006.01)

(52) U.S. Cl.
CPC .................................. *A01K 13/002* (2013.01)

(58) Field of Classification Search
CPC .................. A01K 13/002; A46B 17/06; A46B 2200/1093; A45D 24/40
USPC .......................................... 119/625, 628, 629
See application file for complete search history.

(56) References Cited

U.S. PATENT DOCUMENTS

| | | | | | |
|---|---|---|---|---|---|
| 187,912 | A | * | 2/1877 | Rundle | A01K 13/002 |
| | | | | | 119/628 |
| 591,074 | A | * | 10/1897 | Day | A01K 13/002 |
| | | | | | 119/629 |
| 693,259 | A | * | 2/1902 | Gilbert | A01K 13/002 |
| | | | | | 119/628 |
| 883,921 | A | * | 4/1908 | Thompson | A01K 13/002 |
| | | | | | 119/628 |
| 962,666 | A | * | 6/1910 | Rahn | A01K 13/002 |
| | | | | | 119/629 |
| 995,443 | A | * | 6/1911 | Danner | A01K 13/002 |
| | | | | | 132/119 |
| 1,050,103 | A | * | 1/1913 | Clemens | A01K 13/002 |
| | | | | | 119/628 |
| 1,116,121 | A | * | 11/1914 | Reidt | A01D 7/10 |
| | | | | | 119/629 |
| 1,137,613 | A | * | 4/1915 | Harris | A01K 13/002 |
| | | | | | 56/328.1 |

(Continued)

*Primary Examiner* — Timothy D Collins
*Assistant Examiner* — Maria E Graber

(57) ABSTRACT

A semi-automatic combing device includes a housing assembly, an operating assembly and a combing assembly. The combing assembly includes a hair-combing member fixed on the housing assembly and a hair-pushing member movably connected to the housing assembly, and the hair-combing member and the hair-pushing member are arranged crosswise; the operating assembly includes an operating key and an operating rod, the operating rod is rotatably connected to the housing assembly, one end of the operating rod is connected to the operating key, the other end of the operating rod is connected to the hair-pushing member. According to the present invention, the other end of the operating rod can press down the hair-pushing member when the operating key is pressed to separate the front end of the hair-pushing member from the hair-combing member, thereby removing hair from the hair-combing member and improving the combing efficiency.

8 Claims, 6 Drawing Sheets

(56) References Cited

U.S. PATENT DOCUMENTS

| | | | | |
|---|---|---|---|---|
| 1,140,663 A * | 5/1915 | Byram | A01D 7/10 | 119/629 |
| 1,169,644 A * | 1/1916 | Hoffman | A01K 13/002 | 119/628 |
| 1,180,781 A * | 4/1916 | McKeown | A01K 13/002 | 119/629 |
| 1,226,757 A * | 5/1917 | Duerr | A01K 13/002 | 119/628 |
| 1,235,138 A * | 7/1917 | Harris | A01K 13/002 | 119/628 |
| 1,249,552 A * | 12/1917 | Taflin | A01K 13/002 | 119/613 |
| 1,280,204 A * | 10/1918 | Garber | A01K 13/002 | 119/629 |
| 4,574,416 A * | 3/1986 | Stewart | A46B 17/06 | 15/184 |
| 4,860,692 A * | 8/1989 | Beard | A01K 13/002 | 119/629 |
| 5,267,528 A * | 12/1993 | Murieen, Sr. | A01K 13/002 | 119/628 |
| 6,199,513 B1 * | 3/2001 | Nichols | A01K 13/002 | 119/633 |
| 6,427,633 B1 * | 8/2002 | Ogden | A01K 13/002 | 119/600 |
| 6,681,775 B2 * | 1/2004 | Wang | A46B 7/023 | 15/186 |
| 7,225,815 B2 * | 6/2007 | Kung | A46B 17/06 | 132/119 |
| 8,006,648 B1 * | 8/2011 | Sourwine | A01K 13/002 | 119/664 |
| 8,082,887 B2 * | 12/2011 | Fernandez | A01K 13/002 | 119/664 |
| 8,347,457 B2 * | 1/2013 | Dyson | A47L 9/0633 | 15/422 |
| 10,098,322 B2 * | 10/2018 | Ferrentino | B26B 19/44 | |
| 10,568,302 B2 * | 2/2020 | Cathaud | A01K 13/002 | |
| 10,918,186 B2 * | 2/2021 | Ott | A45D 24/40 | |
| 2011/0067644 A1 * | 3/2011 | Prochaska | A01K 13/002 | 119/633 |
| 2011/0297101 A1 * | 12/2011 | Fernandez | A01K 13/002 | 119/603 |
| 2014/0026822 A1 * | 1/2014 | Harris, II | A01K 13/002 | 119/625 |
| 2024/0349697 A1 * | 10/2024 | Sumners | A46B 17/06 | |

* cited by examiner

SEMI-AUTOMATIC COMBING DEVICE

CROSS REFERENCES TO RELATED APPLICATION

The present application claims the benefit of Chinese Patent Application No. 202323249095.4 filed on Nov. 30, 2023, the contents of which are incorporated herein by reference in their entirety.

TECHNICAL FIELD

The present invention relates to the technical field of pet supplies, and particularly to a semi-automatic combing device.

BACKGROUND ART

In the prior art, a common open knot comb is used to solve the problem of pet hair knotting. However, when using a conventional open knot comb, the pet's hair tends to tangle around the open knot comb, making the cleaning work cumbersome. After combing a pet, a user usually needs to perform additional manual operations to completely remove the tangled hair from the open knot comb, reducing the combing efficiency.

SUMMARY

The object of the present invention is to provide a semi-automatic combing device, aiming at solving the problem in the prior art that open knot combs require manual hair removal.

In order to solve the above technical problem, the object of the present invention is realized by the following technical solutions: providing a semi-automatic combing device, including a housing assembly, an operating assembly and a combing assembly; the combing assembly including a hair-combing member and a hair-pushing member, the rear end of the hair-combing member being fixed on the housing assembly, the rear end of the hair-pushing member being movably connected to the housing assembly, and the front ends of the hair-combing member and the hair-pushing member being arranged crosswise; the operating assembly including an operating key and an operating rod, the operating rod being rotatably connected to the housing assembly, one end of the operating rod being connected to the operating key, the other end of the operating rod being connected to the hair-pushing member, and the operating key being positioned outside the housing assembly, and when the operating key is pressed, the other end of the operating rod pressing down the hair-pushing member to separate the front end of the hair-pushing member from the hair-combing member.

Further, the housing assembly includes a handle housing and a head housing connected to a front end of the handle housing, the operating key is positioned outside the handle housing, the other end of the operating rod extends into the head housing, the rear ends of the hair-combing member and the hair-pushing member are both positioned in the head housing, and the front ends of the hair-combing member and the hair-pushing member extend out of a front end of the head housing.

Further, the operating rod is rotatably connected in the handle housing by a first rotation shaft, and the first rotation shaft is horizontally perpendicular to a length direction of the handle housing.

Further, the rear end of the hair-pushing member is rotatably connected in the head housing.

Further, the rear end of the hair-pushing member is rotatably connected in the head housing by a second rotation shaft, and the second rotation shaft is horizontally perpendicular to the length direction of the handle housing.

Further, the rear end of the hair-pushing member is up-down movably connected in the head housing.

Further, a top of a middle end of the hair-pushing member is provided with a boss, and the other end of the operating rod is abutted against a top surface of the boss.

Further, the semi-automatic combing device further includes a first elastic member and a second elastic member, wherein one end of the first elastic member is fixedly connected to the hair-pushing member and the other end is fixedly connected to a top of the head housing; and one end of the second elastic member is abutted against an upward side of the operating key, and the other end is abutted against a top of the handle housing.

Further, the front end of the hair-combing member is provided side by side with a plurality of hair-combing pieces, and the front end of the hair-pushing member is provided side by side with a plurality of gaps, each of the hair-combing pieces is inserted into a corresponding one of the gaps and is movable relative to the gap.

Further, the hair-combing piece includes a hair-combing piece body and an extension piece arranged downward at a front end of the hair-combing piece body, and a hair-accumulating slot is provided between the back of each extension piece and the hair-combing piece body.

In the embodiment of the present invention, the other end of the operating rod can press down the hair-pushing member when the operating key is pressed to separate the front end of the hair-pushing member from the hair-combing member, thereby removing hair from the hair-combing member and improving the combing efficiency.

BRIEF DESCRIPTION OF THE DRAWINGS

In order to illustrate the technical solution of the embodiments of the present invention more clearly, the drawings that need to be used in the description of the embodiments will be briefly introduced below. It is obvious that the drawings in the following description are some embodiments of the present invention, and for those skilled in the art, other drawings can also be obtained according to these drawings without paying creative labor.

REFERENCE SIGNS

10: housing assembly; 11: handle housing; 111: handle upper housing; 112: handle lower housing; 113: handle upper slot; 114: handle lower slot; 12: head housing; 121: head upper housing; 1211: rotating shaft upper groove; 122: head lower housing; 1221: rotating shaft lower groove; 123: first hook;

20: operating assembly; 21: operating key; 211: pressing plane; 22: operating rod; 23: first rotation shaft;

30: combing assembly; 31: hair-combing member; 311: hair-combing piece; 3111: hair-combing piece body; 3112: extension piece; 3113, hair-accumulating slot; 32, hair-pushing member; 321: boss; 322: gap; 323: second hook; 33: second rotation shaft;

40: first elastic member; 41: second elastic member.

DETAILED DESCRIPTION OF THE INVENTION

The technical solutions of the embodiments of the present invention will be clearly and completely described below with reference to the drawings of the embodiments of the present invention. It is obvious that the described embodiments are some embodiments of the present invention, not all embodiments. Based on the embodiments in the present invention, all the other embodiments obtained by those skilled in the art without paying creative labor fall within the scope of protection of the present invention.

It should be understood that the terms "comprise" and "include", when used in this specification and the accompanying claims, indicate the existence of the described features, wholes, steps, operations, elements, and/or assemblies, but do not exclude the existence or addition of one or more other features, wholes, steps, operations, elements, assemblies, and/or groups thereof.

It should also be understood that the terms used in the description of the present invention herein are for the purpose of describing particular embodiments only and are not intended to limit the present invention. As used in the description of the present invention and the accompanying claims, the singular forms "a/an", "one", and "the" are intended to include the plural forms as well, unless the context clearly indicates otherwise.

It should be further understood that the term "and/or" used in the description of the present invention and the accompanying claims refers to and includes any and all possible combinations of one or more of the associated listed items.

Figure 1:
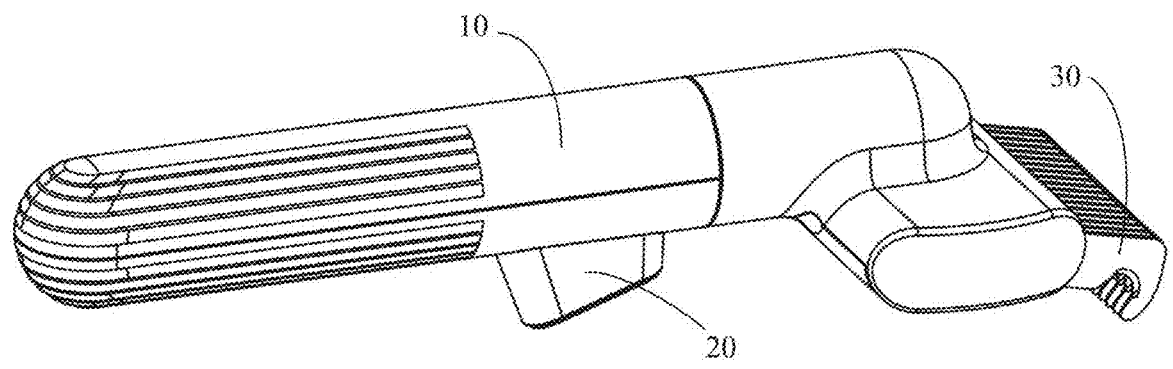
FIG. 1 is a structural schematic view of a semi-automatic combing device according to an embodiment of the present invention.
Figure 2:
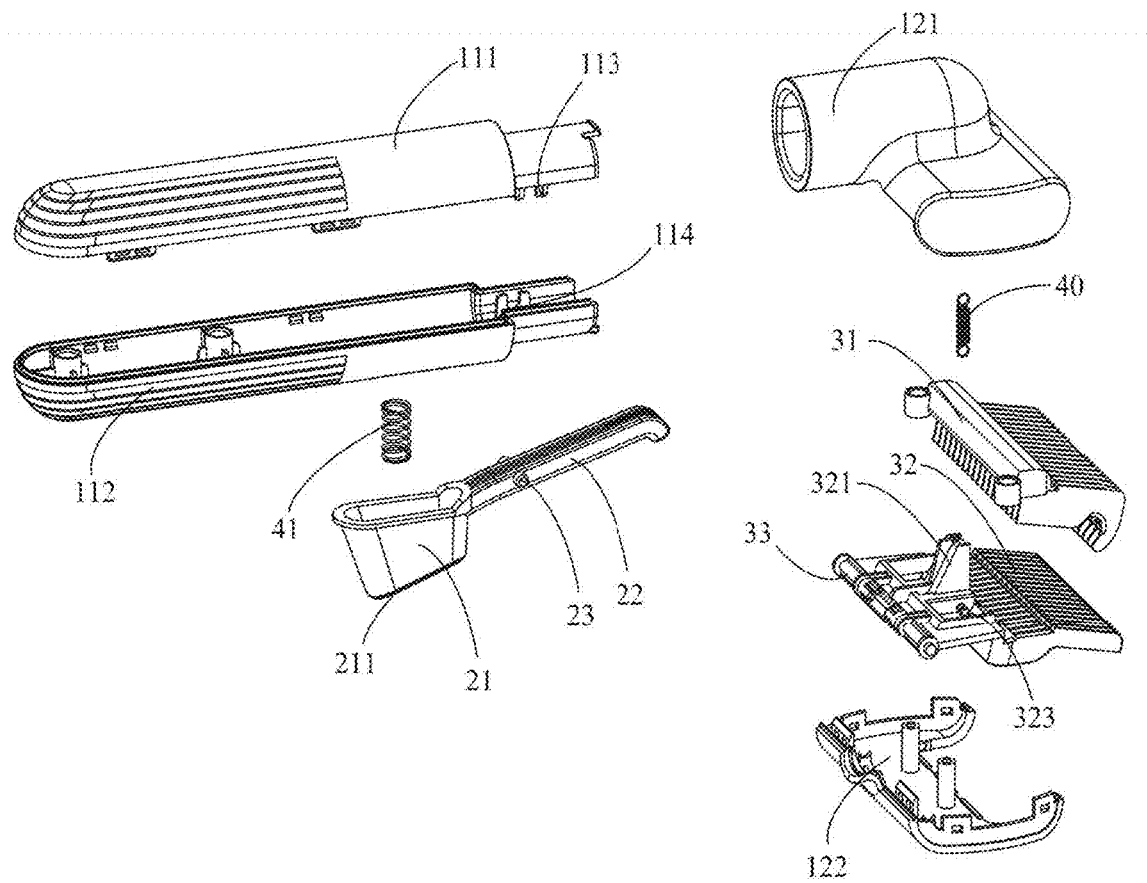
FIG. 2 is an exploded view of the semi-automatic combing device according to the embodiment of the present invention.

Referring to FIGS. 1 and 2, the embodiment of the present invention provides a semi-automatic combing device, including a housing assembly 10, an operating assembly 20 and a combing assembly 30; the combing assembly 30 includes a hair-combing member 31 and a hair-pushing member 32, a rear end of the hair-combing member 31 is fixed on the housing assembly 10, a rear end of the hair-pushing member 32 is movably connected to the housing assembly 10, and the hair-combing member 31 and the front end of the hair-pushing member 32 are arranged crosswise; the operating assembly 20 includes an operating key 21 and an operating rod 22, wherein the operating rod 22 is rotatably connected to the housing assembly 10, one end of the operating rod 22 is connected to the operating key 21, the other end of the operating rod 22 is connected to the hair-pushing member 32, and the operating key 21 is positioned outside the housing assembly 10; when the operating key 21 is pressed, the other end of the operating rod 22 presses down the hair-pushing member 32 to separate the front end of the hair-pushing member 32 from the hair-combing member 31.

In the embodiment, the operating key 21 is positioned outside the housing assembly 10 to facilitate the user's operation. The operating rod 22 is rotatably connected to the housing assembly 10, so that it can rotate around the rotation point, so that the other end of the operating rod 22 can swing up and down to exert a force on the hair-pushing member 32 when moving downward. The hair-combing member 31 and the front end of the hair-pushing member 32 are arranged crosswise, and when combing hair, the two are crossed together to realize the hair-combing function. When need to clean up the accumulated hair on the hair-combing member 30, the user only needs to press the operating key 21 (as shown in the perspective of FIG. 1, that is, the operating key 21 is pressed upward), one end of the operating rod 22 connected to the operating key 21 moves upward accordingly, and the other end of the operating rod 22 can move downward synchronously around the rotation point so as to push down the hair-pushing member 32, and the movement of the hair-pushing member 32 will separate the front end thereof from the hair-combing member 31 so as to push out the hair clamped between the two. This process reduces the amount of clean-up after combing.

Figure 3:
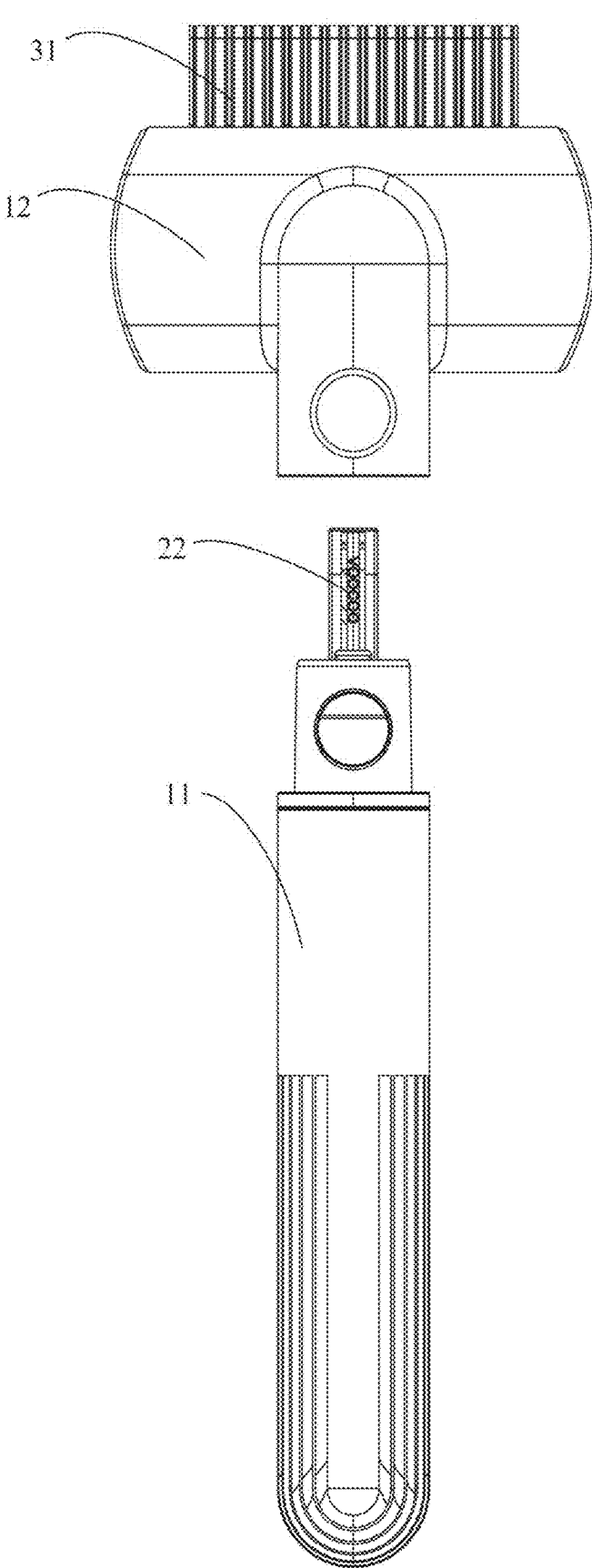
FIG. 3 is a structural schematic view of a combing assembly according to a first embodiment of the present invention.

Referring to FIG. 3, in one embodiment, the housing assembly 10 includes a handle housing 11 and a head housing 12 connected to the front end of the handle housing 11, the operating key 21 is positioned outside the handle housing 11, the other end of the operating rod 22 extends into the head housing 12, the rear ends of the hair-combing member 31 and the hair-pushing member 32 are both positioned in the head housing 12, and the front ends of the hair-combing member 31 and the hair-pushing member 32 both extend out of the front end of the head housing 12.

In the embodiment, the head housing 12 can accommodate the hair-combing member 31 and the hair-pushing member 32, and the rear ends of the hair-combing member 31 and the hair-pushing member 32 are both positioned in the head housing 12. The front ends of the hair-combing member 31 and the hair-pushing member 32 both extend out of the front end of the head housing 12, so that the hair can be combed and cleaned efficiently when combing. A pressing plane 211 is provided on the operating key 21, and the user pushes the operating key 21 into the handle housing 11 by pressing the pressing plane 211, thereby driving the other end of the operating rod 22 to push the hair-pushing member 32.

In one embodiment, the operating rod 22 is rotatably connected in the handle housing 11 by a first rotation shaft 23, and the first rotation shaft 23 is horizontally perpendicular to a length direction of the handle housing 11.

In the embodiment, the operation rod 22 is rotatably connected to the handle housing 11 by the first rotation shaft 23, and the operating rod 22 can be rotated inside the handle housing 11 with the first rotation shaft 23 as the rotation axis. The first rotation shaft 23 is designed to be horizontal and perpendicular to the length direction of the handle housing 11, and when the user presses the operating key 21, the operating rod 22 rotates along the width direction of the handle housing 11. By pressing the operating key 21, the operating rod 22 rotates around the first rotation shaft 23, and the rotation of the operating rod 22 can drive the hair-pushing member 32 connected to the other end thereof to move correspondingly in the head housing 12.

Specifically, the handle housing 11 includes a handle upper housing 111 and a handle lower housing 112, one end of the handle upper housing 111 corresponding to the first rotation shaft 23 is provided with a handle upper slot 113, the other end of the handle lower housing 112 corresponding to the first rotation shaft 23 is provided with a handle lower slot 114, and both ends of the first rotation shaft 23 can rotate in the handle upper slot 113 and the handle lower slot 114 simultaneously.

In one embodiment, the rear end of the hair-pushing member 32 is rotatably connected in the head housing 12.

In the embodiment, the rear end of the hair-pushing member 32 may be connected to the head housing 12 by a rotating shaft, and the rotating shaft enables the hair-pushing member 32 to perform a rotational movement within the head housing 12 around its axis. When the user presses the operating key 21, the hair-pushing member 32 rotates around the rotation shaft inside the head housing 12 by the driving of the operating lever 22, so that the front end of the hair-pushing member 32 moves relative to the fixed hair-combing member 31, thereby pushing out the accumulated hairs on the hair-combing member 31.

In one embodiment, the rear end of the hair-pushing member 32 is rotatably connected in the head housing 12 by a second rotation shaft 33, and the second rotation shaft is horizontally perpendicular to the length direction of the handle housing 11.

In the embodiment, due to the arrangement of the second rotation shaft 33 horizontally perpendicular to the length direction of the handle housing 11, the rotation of the hair-pushing member 32 causes the front end thereof to move relative to the hair-combing member 31 in a specific manner, thereby pushing out the accumulated hairs on the hair-combing member 31.

Figure 4:
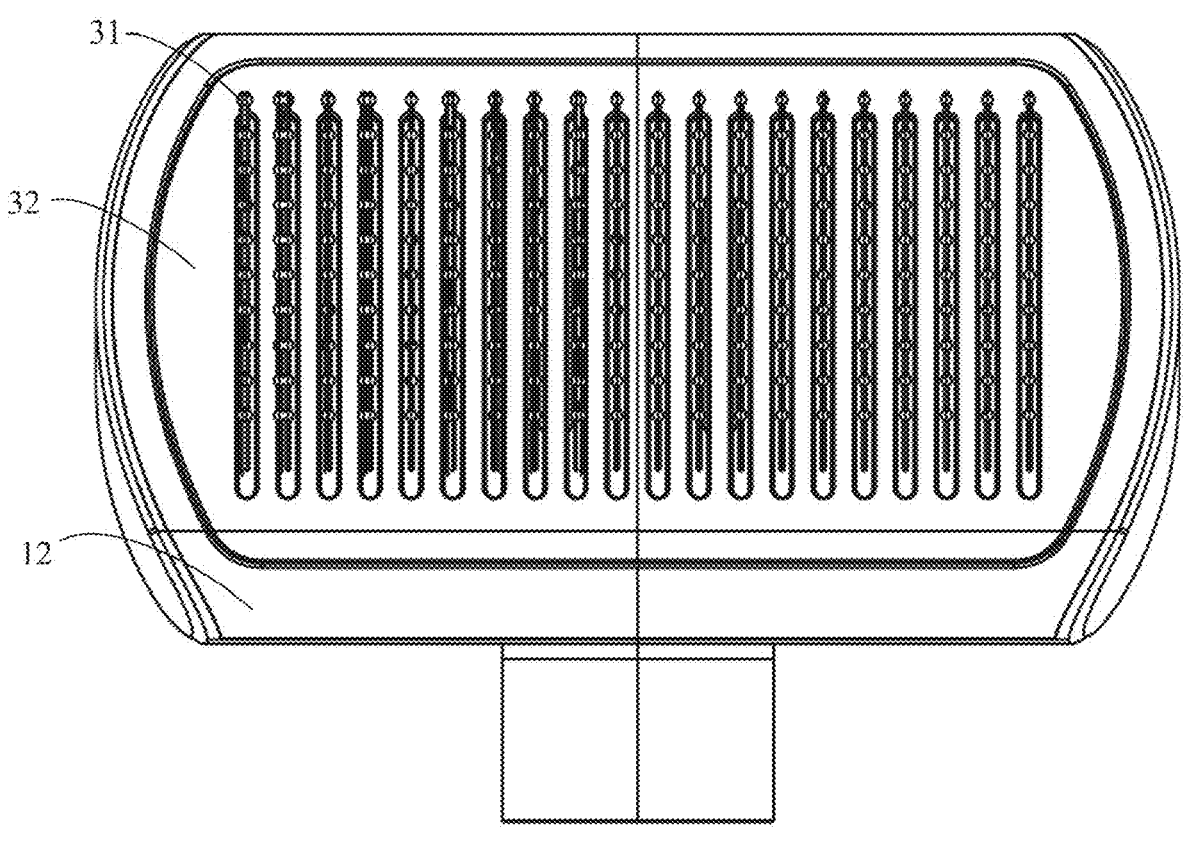
FIG. 4 is a structural schematic view of a combing assembly according to a second embodiment of the present invention.
Figure 5:
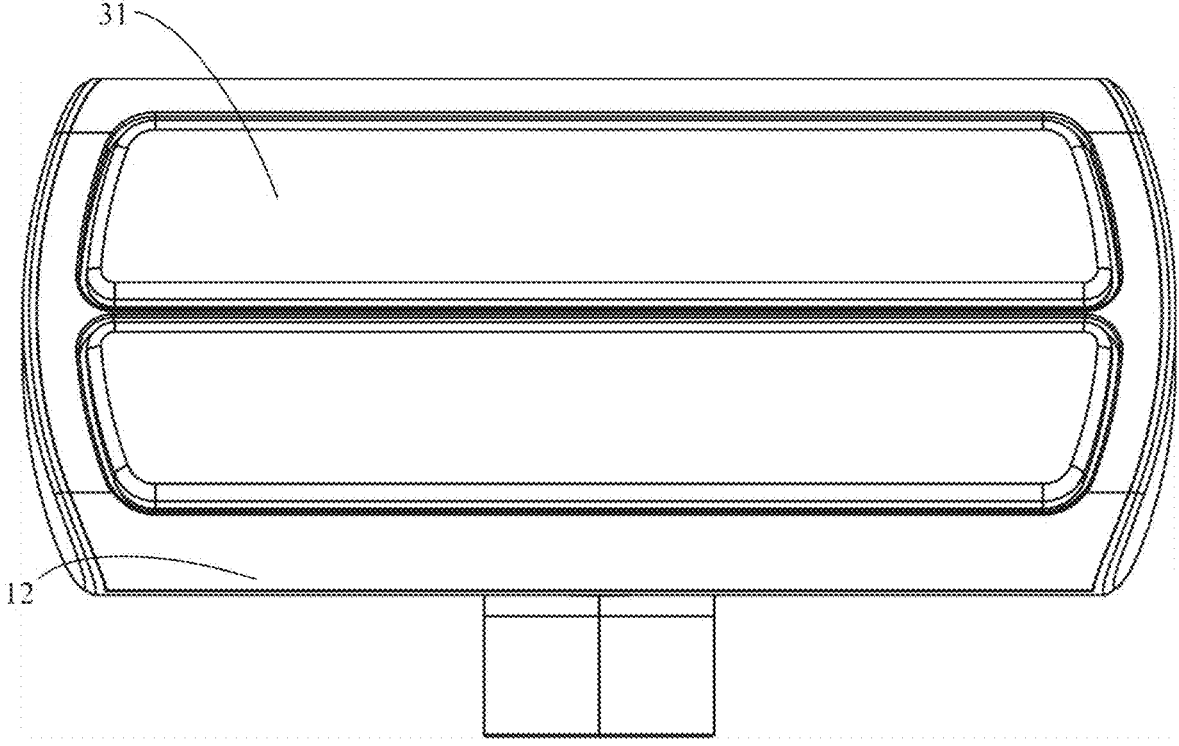
FIG. 5 is a structural schematic view of a combing assembly according to a third embodiment of the present invention.

Referring to FIGS. 4 and 5, in one embodiment, the rear end of the hair-pushing member 32 is up-down movably connected in the head housing 12.

In this embodiment, the rear end of the hair-pushing member 32 may be designed to be up-down movably connected in the head housing 12, such connection enables the hair-pushing member 32 to move vertically within the head housing 12 to push out the accumulated hairs on the hair-combing member 31 over a large area. As shown in FIG. 4, specifically, the user normally combs the pet with the hair-combing member 31, and when enough hair accumulates on the hair-combing member 31 and needs to be cleaned, the user activates the hair-pushing mechanism by pressing the operating key 21 positioned on the handle housing 11. The operating key 21 drives the operating rod 22 to apply a force to the hair-pushing member 32, so that the whole hair-pushing member 32 moves up and down in the head housing 12; when the hair-pushing member 32 moves downward, its front end makes contact with the hair on the hair-comb member 31 and pushes it out. A guide rail or guide post may also be provided on the hair-combing member 31 to guide the hair-pushing member 32 to move downward along the guide rail or guide post.

Further, the embodiment further provides another combing assembly 30, as shown in FIG. 5, the combing member 31 is also positioned on the head housing 12, but when the combing member 31 is in use, only need to use the combing member 31 to rub on the target object, the hair on the surface of the target object can be glued out, and the combing member 31 can be applied to such as clothes, sofas, etc.

Figure 6:
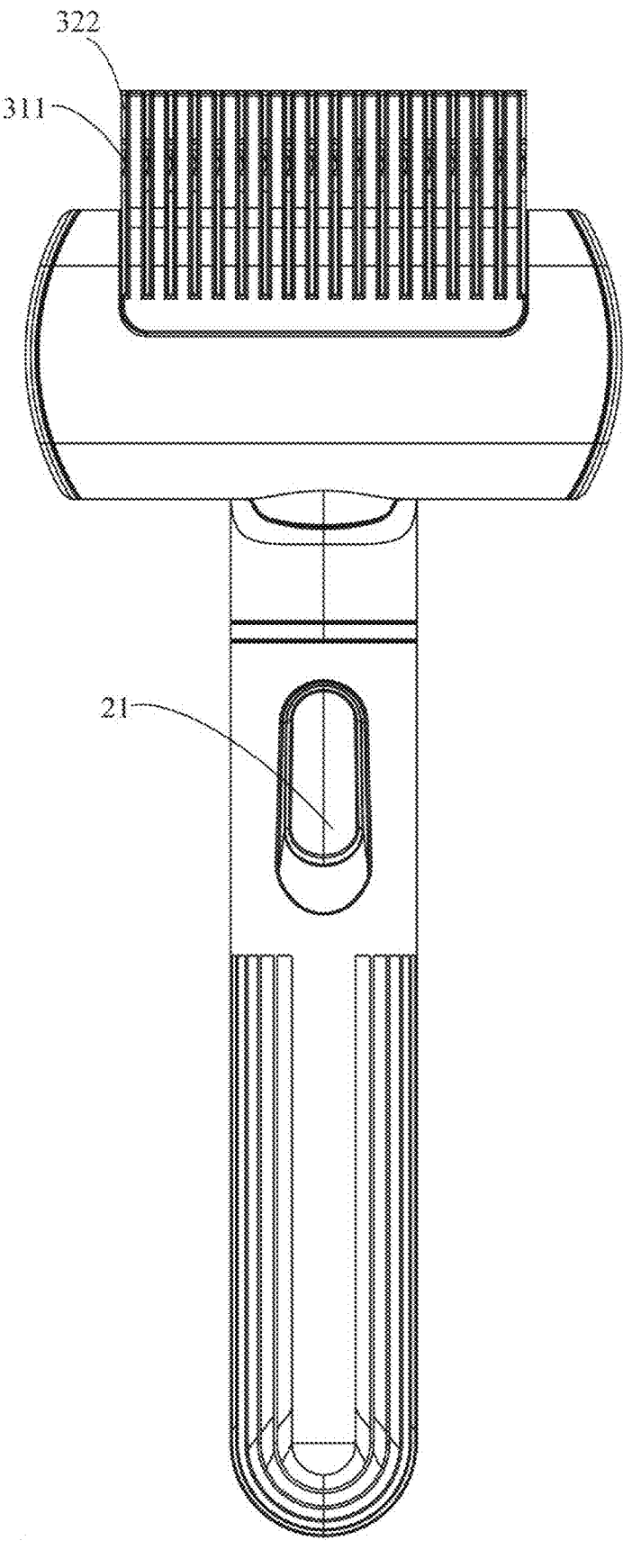
FIG. 6 is another structural schematic view of the semi-automatic combing device according to the embodiment of the present invention.
Figure 7:
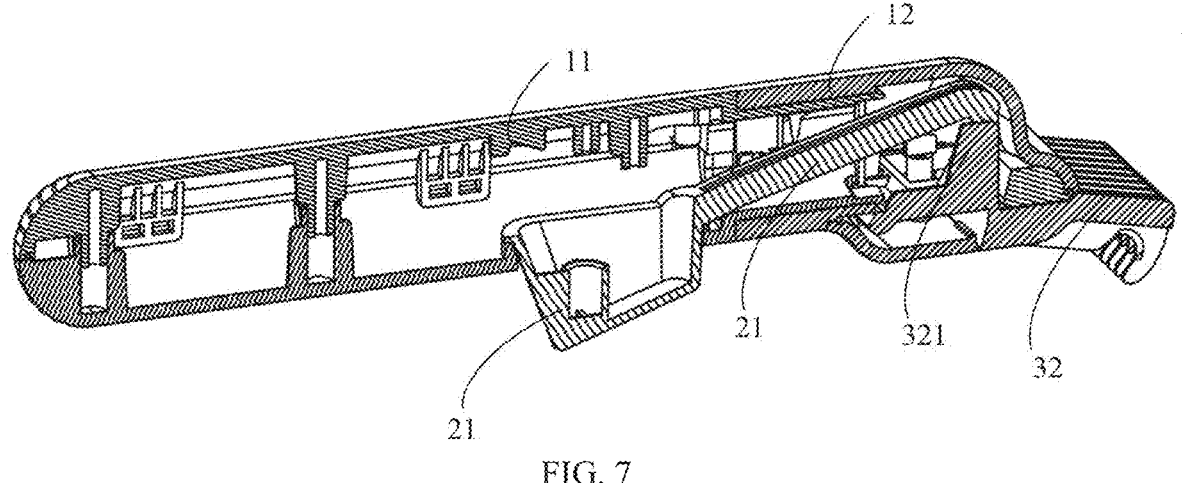
FIG. 7 is a first sectional view of the semi-automatic combing device according to the embodiment of the present invention.

Referring to FIGS. 6 and 7, in one embodiment, the top of the middle end of the hair-pushing member 32 is provided with a boss 321, and the other end of the operating rod 22 is abutted against a top surface of the boss 321.

In the embodiment, the boss 321 provides a support point for the pushing action of the operating rod 22, and the other end of the operating rod 22 abuts against the top surface of the boss 321. When the operating key 21 is pressed, the operating rod 22 can push the hair-pushing member 32 to move through its contact with the boss 321, so as to push out the accumulated hairs on the hair-combing member 31. It should be noted that the boss 321 can be arranged at the middle end of the hair-pushing member 32 against the operating rod 22, or it can be arranged near the rear end of the hair-pushing member 32 to facilitate the operating rod 22 to contact the boss 321 The surface of the boss 321 facing the operating rod 22 can also be designed as an inclined surface, the top surface of the boss 321 smoothly transitions with the inclined surface, and the other end of the operating rod 22 is correspondingly provided as a rounded end, which can be slidably matched with the boss 321 to facilitate the operating rod 22 pushing the boss 321 to drive the hair-pushing member 32 to move.

Figure 8:
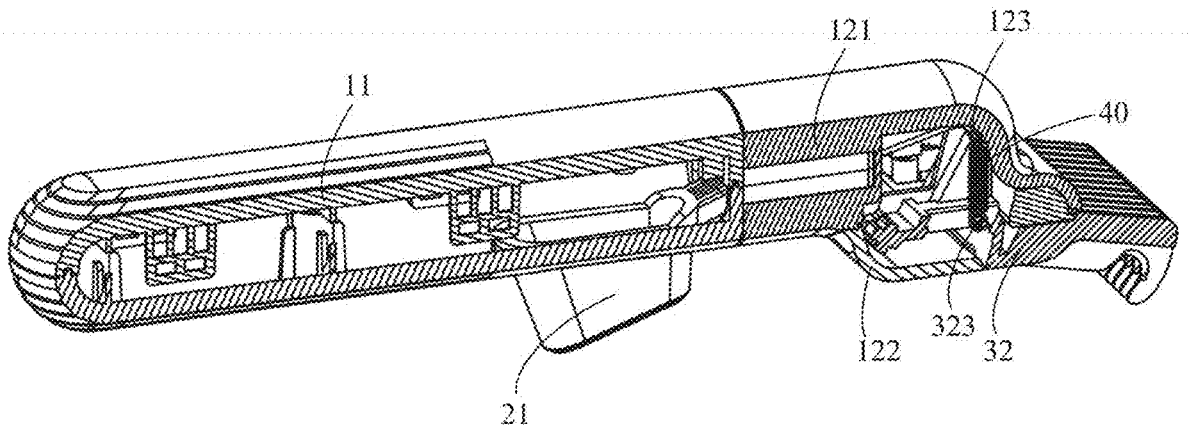
FIG. 8 is a second sectional view of the semi-automatic combing device according to the embodiment of the present invention.
Figure 9:
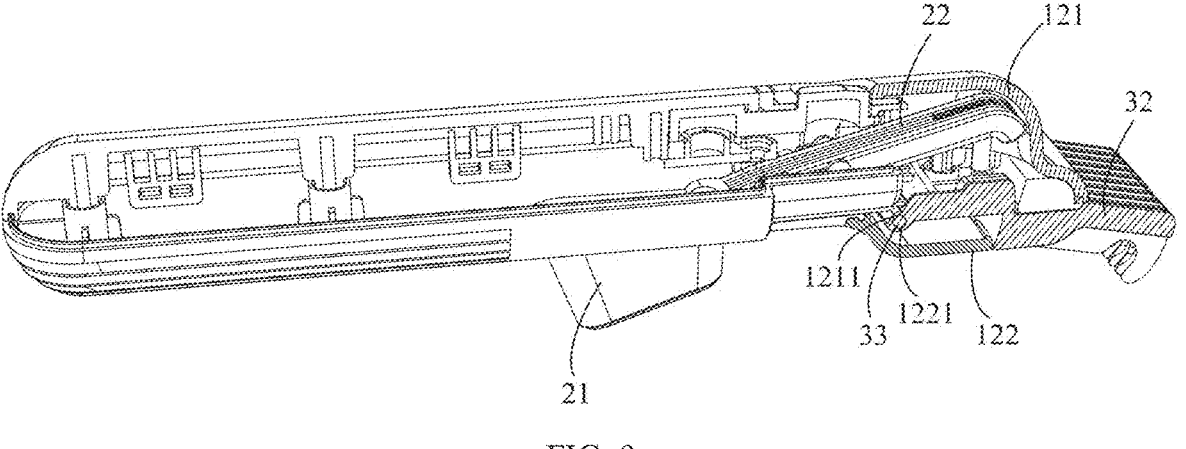
FIG. 9 is a third sectional view of the semi-automatic combing device according to the embodiment of the present invention.

Referring to FIGS. 8 and 9, in one embodiment, further including a first elastic member 40 and a second elastic member 41, wherein one end of the first elastic member 40 is fixedly connected to the hair-pushing member 32, and the other end is fixedly connected to the top of the head housing 12; one end of the second elastic member 41 is abutted against an upward side of the operating key 21, and the other end is abutted against the top of the handle housing 11.

In the embodiment, the first elastic member 40 provides a necessary reset force to ensure that the hair-pushing member 32 can automatically return to its original position after use. Specifically, when the operating key 21 is pressed, the operating rod 22 transmits a force to the hair-pushing member 32, and the hair-pushing member 32 moves along its active path, during which the first elastic member 40 is stretched, and once the force applied to the operating key 21 is released, the first elastic member 40 pulls the hair-pushing member 32 back to the original position by its own elasticity, ready for the next use.

Specifically, the head housing 12 includes a head upper housing 121 and a head lower housing 122, the first elastic member 40 is arranged between the head upper housing 121 and the head lower housing 122, the head upper housing 121 is provided with a first hook 123 corresponding to one end of the first elastic member 40, the hair-pushing member 32 is provided with a second hook 323 corresponding to the other end of the first elastic member 40, one end of the first elastic member 40 is fixedly connected to the first hook 123, and the other end of the first elastic member 40 is fixedly connected to the second hook 323.

Further, a rotating shaft upper groove 1211 is correspondingly provided at a position of the head upper housing 121 close to the second rotation shaft 33, a rotating shaft lower groove 1221 is correspondingly provided at a position of the head lower housing 122 close to the second rotation shaft 33, when the head upper housing 121 and the head lower housing 122 cover each other, the rotating shaft upper groove 1211 and the rotating shaft lower groove 1221 form a rotation space, and the second rotation shaft 33 can rotate in the rotation space to drive the hair-pushing member 32 to rotate.

Further, when the operating key 21 is pressed, the second elastic member 41 is compressed, thereby accumulating an elastic restoring force, and when the operating key 21 is released, the second elastic member 41 releases its elastic restoring force, thereby pushing the operating key 21 to reset. The second elastic member 41 may specifically be a spring, the top of the operating key 21 is provided with a mounting slot, the lower end of the second elastic member 41 is abutted against a slot bottom of the mounting slot, and the upper end is abutted against a top inner wall of the handle upper housing 111, and when the operating key 21 is not pressed, the spring may exert an elastic force on the slot bottom of the mounting slot, so that the operating key 21 is kept protruding outside the handle housing 11. In order to maintain the position of the second elastic member 41 (i.e. a spring), guide posts may be provided on the top inner wall of the handle upper housing 111 and the slot bottom of the mounting slot oppositely, and the spring may be sheathed between the two guide posts and connected to the guide posts.

In one embodiment, the front end of the hair-combing member 31 is provided side by side with a plurality of hair-combing pieces 311, and the front end of the hair-pushing member 32 is provided side by side with a plurality of gaps 322, and each of the hair-combing pieces 311 is inserted into a corresponding one of the gaps 322 and is movable relative to the gap 322.

In the embodiment, the front end of the hair-pushing member 32 is designed with a plurality of gaps 322 corresponding to the hair-combing piece 311 (the hair-combing piece can be a blade, etc.), and each hair-combing piece 311 can be inserted into a corresponding gap 322 and can move up and down relative to the gap 322, that is, specifically, when pushing hairs, the gap 322 therein can move downward while the hair-combing piece 311 remains stationary, so that the hair-combing piece 311 is separated from the gap 322, and when the hair-pushing is completed, the gap 322 therein can move up again while the hair-combing piece 311 remains stationary, so that the hair-combing piece 311 returns to the gap 322. Specifically, when the user combs the pet with the semi-automatic combing device, the combing assembly 30 passes through the pet's hair, combs and catches the fallen hair, and gradually accumulates the hair on the combing assembly 30 as the combing process progresses, and the user needs to clean up the accumulated hair. When the operating key 21 is pressed, the operating rod 22 drives the hair-pushing member 32 so that the gap 322 moves relative to the hair-combing piece 311, and the hair-pushing member 32 can effectively scrape the accumulated hair from the hair-combing piece 311.

Figure 10:
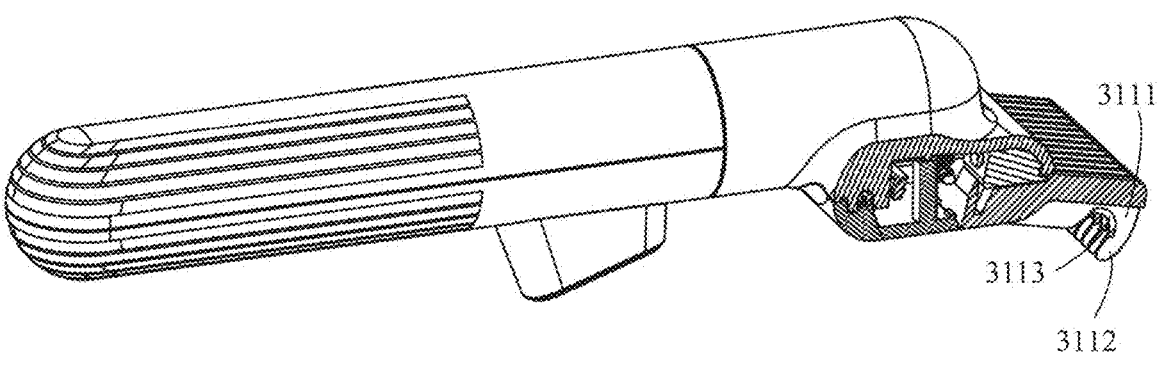
FIG. 10 is a fourth sectional view of the semi-automatic combing device according to the embodiment of the present invention.

Referring to FIG. 10, in one embodiment, the hair-combing piece 311 includes a hair-combing piece body 3111 and an extension piece 3112 arranged downward at a front end of the hair-combing piece body 3111, and a hair-accumulating slot 3113 is provided between the back of each extension piece 3112 and the hair-combing piece body 3111.

In the embodiment, the hair-combing piece body 3111 is the main part of the hair-combing piece 311, which is responsible for directly contacting and combing the pet's hair, and is usually made of a durable and mild material to ensure that the pet's skin or hair is not damaged during the combing process. The extension piece 3112 is extended downward and arranged at the front end of the hair-combing piece body 3111, which helps to catch and guide the pet's hair more effectively and ensure that the hair can be accurately guided during the combing process. In the structure of the hair-combing piece 311, the hair-accumulating slot 3113 is arranged between the back of the extension piece 3112 and the hair-combing piece body 3111 to form a space for accumulating and storing the fallen hairs during combing. When combing the pet's hair, the fallen hair will be accumulated in the hair-accumulating slot 3113, reducing hair scattering during use. When the accumulated hair needs to be cleaned, the user can easily remove the hair accumulated in the hair-accumulating slot 3113 by operating the self-cleaning mechanism of the semi-automatic combing device. The hair-accumulating slot 3113 may be semi-circular in shape to facilitate hair collection into the hair-accumulating slot 3113.

In summary, when the user combs the pet's hair with the semi-automatic combing device, the hair-combing piece 311 directly contacts the pet hair for combing; the hairs on the hair-combing piece 311 gradually accumulate in the hair-accumulating slot 3113 as the combing process progresses. When the hair-combing piece 311 needs to be cleaned, the user presses the operating key 21 to activate the hair-pushing piece 32; the operating rod 22 drives the hair-pushing member 32 to move up and down along the second rotation shaft 33 by interacting with the boss 321. The first elastic member 40 provides a reset force after the operating key 21 is released, helping the hair-pushing member 32 to return to the initial position in preparation for the next use. The present invention simplifies the hair-removing function of a combing device in the process of combing pet hair, improves the combing efficiency, and the operation is simple, the user can realize self-cleaning only by simply pressing the operating key.

The above is merely a specific embodiment of the present invention, and the scope of protection of the present invention is not limited thereto. Any person skilled in the art can easily conceive various equivalent modifications or substitutions within the technical scope disclosed in the present invention, and these modifications or substitutions should be covered in the scope of protection of the present invention. Therefore, the scope of protection of the present invention should be determined by the scope of protection of the claims.

What is claimed is:

1. A semi-automatic combing device comprising:
a housing assembly;
a combing assembly comprising a hair-combing member and a hair-pushing member, wherein a rear end of the hair-combing member is fixed on the housing assembly, a rear end of the hair-pushing member is movably connected to the housing assembly, and the hair-combing member and a front end of the hair-pushing member are arranged crosswise; and
an operating assembly comprising an operating key and an operating rod, wherein the operating rod is rotatably connected to the housing assembly, one end of the operating rod is connected to the operating key, and the other end of the operating rod is connected to the hair-pushing member, the operating key is positioned outside the housing assembly, and when the operating key is pressed, the other end of the operating rod presses down the hair-pushing member to separate the front end of the hair-pushing member from the hair-combing member;

wherein the housing assembly comprises a handle housing and a head housing connected to a front end of the handle housing, the operating key is positioned outside the handle housing, the other end of the operating rod extends into the head housing, the rear ends of the hair-combing member and the hair-pushing member are both positioned in the head housing, and the front ends of the hair-combing member and the hair-pushing member extend out of a front end of the head housing; wherein a top of a middle end of the hair-pushing member is provided with a boss, and the other end of the operating rod is abutted against a top surface of the boss.

2. The semi-automatic combing device of claim 1, wherein the operating rod is rotatably connected in the handle housing by a first rotation shaft, and the first rotation shaft is horizontally perpendicular to a length direction of the handle housing.

3. The semi-automatic combing device of claim 1, wherein the rear end of the hair-pushing member is movably connected in the head housing in an up-down direction.

4. The semi-automatic combing device of claim 1, further comprising a first elastic member and a second elastic member, wherein one end of the first elastic member is fixedly connected to the hair-pushing member and the other end is fixedly connected to a top of the head housing; and one end of the second elastic member is abutted against an upward side of the operating key, and the other end is abutted against a top of the handle housing.

5. The semi-automatic combing device of claim 1, wherein the front end of the hair-combing member is provided side by side with a plurality of hair-combing pieces, and the front end of the hair-pushing member is provided side by side with a plurality of gaps, each of the hair-combing pieces is inserted into a corresponding one of the gaps and is movable relative to the gap.

6. The semi-automatic combing device of claim 5, wherein the hair-combing piece comprises a hair-combing piece body and an extension piece arranged downward at a front end of the hair-combing piece body, and a hair-accumulating slot is provided between the back of each extension piece and the hair-combing piece body.

7. The semi-automatic combing device of claim 1, wherein the rear end of the hair-pushing member is rotatably connected in the head housing.

8. The semi-automatic combing device of claim 7, wherein the rear end of the hair-pushing member is rotatably connected in the head housing by a second rotation shaft, and the second rotation shaft is horizontally perpendicular to the length direction of the handle housing.

* * * * *